Aug. 10, 1943.   W. A. WEIGHTMAN   2,326,590
WELDING APPARATUS
Filed May 5, 1939   2 Sheets-Sheet 1
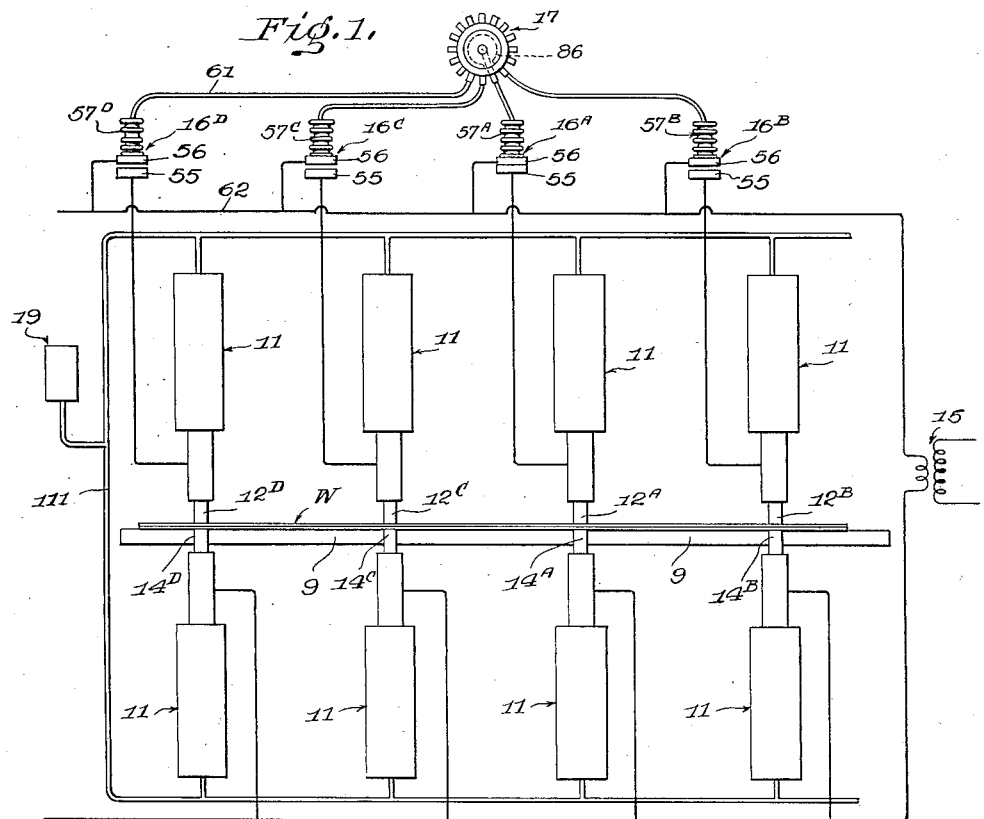
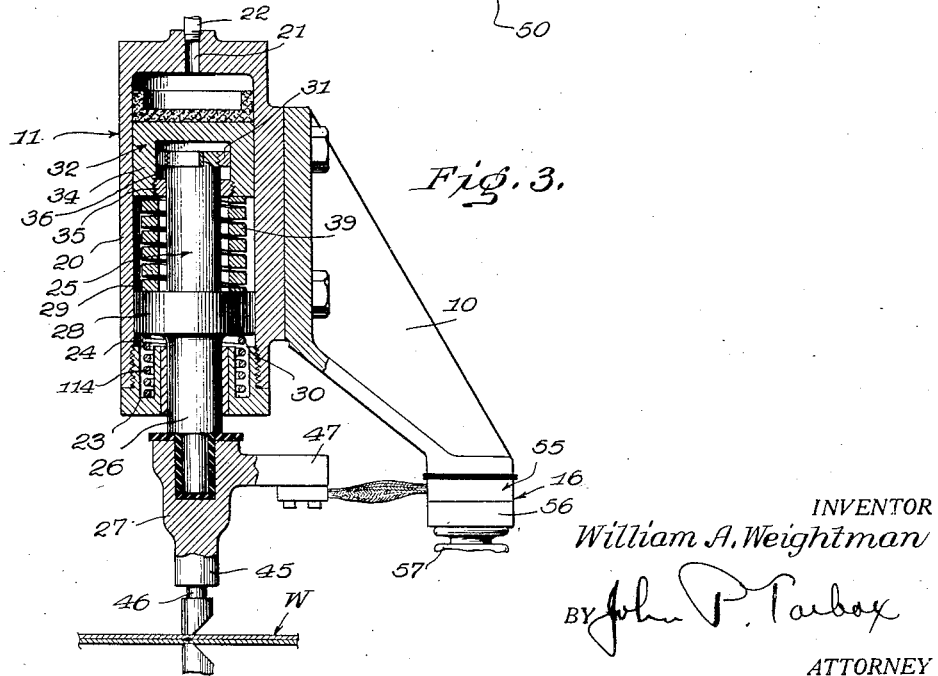
INVENTOR
William A. Weightman
BY John P. Tarbox
ATTORNEY

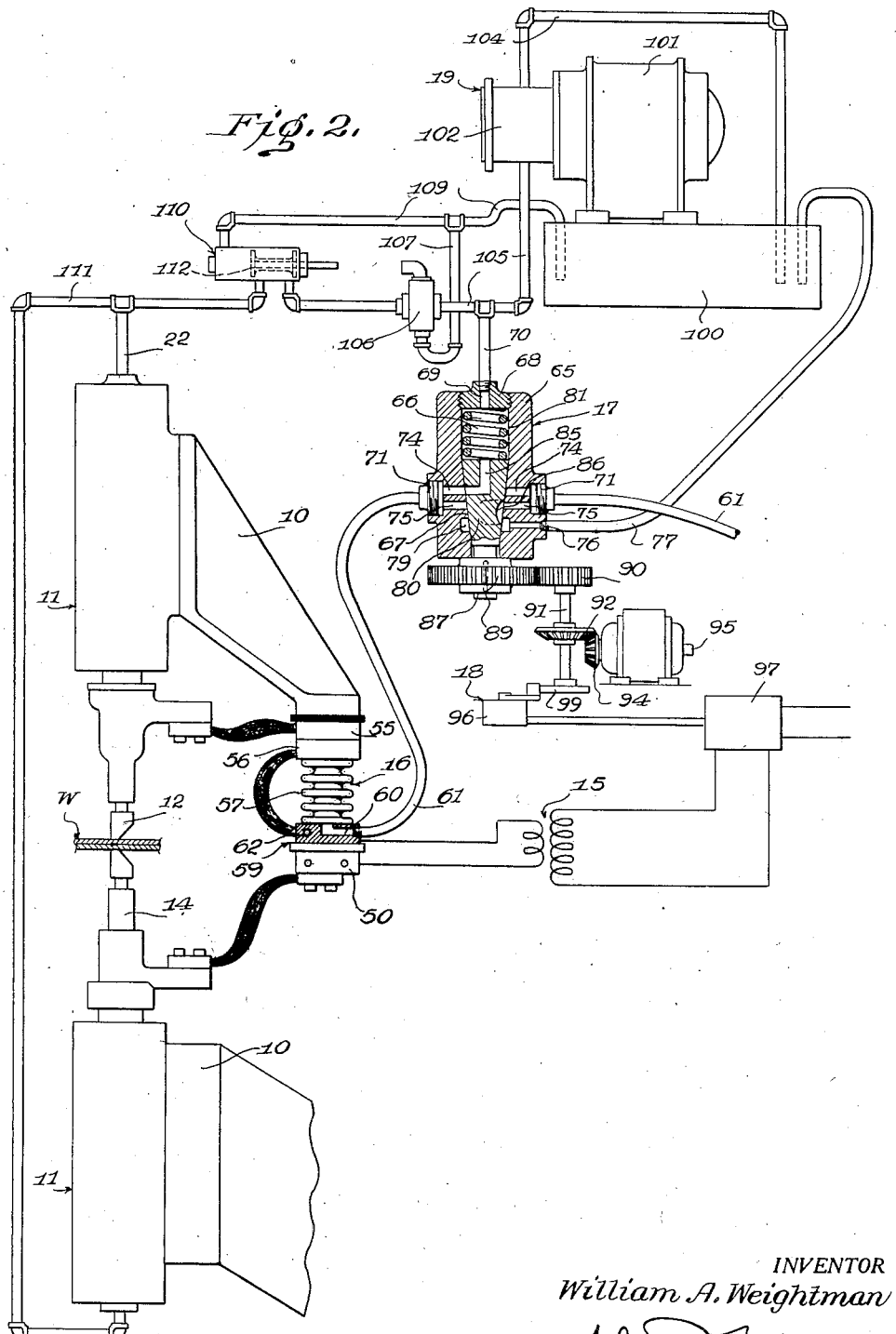

Patented Aug. 10, 1943

2,326,590

UNITED STATES PATENT OFFICE 2,326,590

WELDING APPARATUS

William A. Weightman, Philadelphia, Pa., assignor to Edward G. Budd Manufacturing Co., Philadelphia, Pa., a corporation of Pennsylvania Application May 5, 1939, Serial No. 271,823

3 Claims. (Cl. 219—4)

This invention relates to electric welding apparatus and more particularly to high-speed multiple point welding systems and to an improved method of welding.

Various types of electric welding machines have been designed for welding work pieces together at a great number of points, for example, thirty or more. Usually, a plurality of welding electrodes are utilized, arranged in pairs, each pair adapted to form a weld, and these are electrically connected to the secondary side of a transformer adapted to supply suitable welding current. With machines of this character, the welds are formed one at a time by bringing the pairs of electrodes into engagement with the work, passing current therethrough, dwelling, and then separating the electrodes. A difficulty of such machines is that they are not rapid enough because several seconds are required to move each electrode into and out of engagement with the work and allow sufficient time for welding and dwell. Another difficulty is that the welding pressure applied in making each weld and the time allowed for dwell may vary when fast operation is effected, whereby the resulting welds vary in strength and the joint between the work pieces is not uniform. Also, the potential of the current may vary due to the faulty rapidly made connections. It will be obvious that one bad weld may ruin the entire work. This might happen after a considerable number of welds were made and cause a great loss of time and materials.

The present invention aims to provide an improved high speed welding machine and a method of welding for overcoming the difficulties and disadvantages heretofore encountered.

An object of the present invention is to increase the speed of securing work pieces requiring a plurality of welds.

Another object is to form a plurality of welds which are subjected to uniform welding pressure and as a result join the work pieces uniformly at all points along the seam.

Another object is to provide assurance of sufficient dwell under pressure at the point of weld and maintain the pressure after fusion occurs to forge the work pieces together.

Another object is to provide improved control means for supplying welding current to a plurality of electrodes in rapid succession while maintaining all the electrodes in engagement with work.

To accomplish the enumerated objects, the invention provides a machine wherein pairs of welding electrodes engage the work simultaneously and remain engaged until a welding current has been successively passed through each pair of electrodes. In this manner is is possible to avoid the usual delay necessary in first mechanically engaging the work by each pair of electrodes, thereafter, passing the welding current therethrough and then dwelling for a few seconds prior to separating the electrodes and prior to engaging the subsequent pairs.

The invention further provides a simple, economically operable device for successively supplying a uniform welding current for a relatively short period of time first to one pair of electrodes and then to others until all the welds have been completed.

In the accompanying drawings:

Fig. 1 is a diagrammatic view of a machine for forming a plurality of welds, illustrating an embodiment of the invention;

Fig. 2 is a fragmentary view, partly in section, of a pair of welding electrodes together with devices for operating and controlling the same; and Fig. 3 is an enlarged sectional view, illustrating a mechanism for moving the electrodes into engagement with the work which is adapted to insure proper dwelling of the welds.

Referring more particularly to the drawings there is shown a welding machine which generally comprises a frame having work supports 9 and brackets 10 for supporting the pressure operated mechanisms 11 adapted to move upper welding electrodes 12 and lower welding electrodes 14 relative to the work; a transformer 15 for supplying suitable welding current from the secondary side thereof, control devices including switches 16 for connecting the electrodes to the secondary side of the transformer, a distributor 17 for closing and opening the switches in rapid succession, and timing means 18 synchronized with the distributor for periodically connecting the primary side of the transformer to a source of electricity during the intervals that one of the switches 16 is closed; and means 19 for supplying fluid pressure for operating the electrode moving mechanisms 11 and the distributor 17.

As illustrated more particularly in Fig. 1, any suitable number of upper and lower welding electrodes may be provided, for example thirty or forty (four of which are shown herein for illustrative purposes), and these may be arranged on the frame of the machine to weld work-pieces of any contour. The electrodes are mounted in pairs comprising an upper electrode and a lower electrode in opposed relation thereto so that the welding current is passed directly through the work-pieces at the point of weld. All pairs of electrodes and their moving mechanisms are similar in construction, therefore, a detailed description of one pair will serve for all. Also, the upper and lower electrode moving mechanisms are similar in construction, except that the upper mechanisms are adapted to move downwardly toward the work whereas the lower mechanisms are inverted and are adapted to move the electrodes upwardly.

In Fig. 3, one of the mechanisms 11 for moving an upper electrode is illustrated in detail. This mechanism, in its preferred form, comprises an upright cylinder 20 having an aperture 21 at its upper end for receiving a pipe 22 adapted to supply a fluid pressure medium, such as oil, and a collar or bushing 23 threaded into the lower end of the cylinder and having a shoulder 24. A plunger or piston rod 25 is slidably mounted in the cylinder and has its lower end 26 extending through the bushing 23 to serve as means for securing an electrode holder or yoke 27. Intermediate its ends, the plunger has a flange 28 provided with an upper shoulder 29 and a lower shoulder 30 adapted to abut the shoulder 24 of the bushing and thereby limit downward movement of the plunger with respect to the cylinder. The upper end of the plunger has a flange 31 threaded or otherwise secured thereon above which a piston 32 is slidably mounted in the cylinder. The piston preferably has a depending sleeve 34 provided with a bore for receiving the upper flange 31 of the plunger and a collar 35 extends about the plunger and is threaded into the bore at the lower end of the sleeve. The collar has a shoulder 36 for engaging the underside of the flange 31 to prevent separation of the piston and plunger, and to move the plunger upwardly with the piston.

The piston is adapted to move the plunger downwardly through the intermediation of a spring 39, capable of withstanding suitable tension, which is coiled about the upper portion of the plunger. The lower end of the coil is seated on the shoulder 30 of the plunger flange 28, and the upper end abuts the lower end of the piston sleeve 34 or the collar 35. In this manner, when the piston moves the plunger and the electrode carried thereon downward, the electrode is yieldably pressed into contact with the work.

The spring normally is subjected to tension and is pre-compressed by compressing it between the plunger shoulder 30 and piston sleeve 34 so that it at all times tends to urge the plunger downwardly with respect to the piston. With this arrangement, when the plunger is moved downwardly and the electrode has engaged the work, the piston and plunger move relatively and further compress the spring. When, during welding, the work fuses and under forging pressure decreases in thickness at the point of weld practically instantaneously, the spring causes the plunger and the electrode thereon to quickly follow the work independently of movement of the piston and thereby insures and maintains the application of proper forging and dwell pressure on the work (Fig. 3).

The yokes or holders 27 for the welding electrodes are suitably attached to the protruding ends 26 of the plungers 25, but are insulated therefrom. Preferably, each holder may be a sleeve 45 wherein the shank 46 of an electrode may be removably secured in the usual manner and has a terminal 47 adapted to be electrically connected to the transformer 15, as about to be described.

The terminal 47 of each lower electrode is electrically connected to a bus bar or conductor 50 of low resistance which is secured to the frame of the machine, but is insulated therefrom, and the bus bar in turn is electrically connected to one pole of the secondary side of the transformer 15. Each upper electrode is provided with a switch 16 which may be of the Sylphon type shown, although any other suitable switches may be utilized. These switches comprise an upper stationary broad heavy current carrying contact 55 secured to the frame, but insulated therefrom, and electrically connected to the terminal 47 of an upper electrode; a complementary lower contact 56 adjacent the contact 55; a pressure operated bellows 57 secured at one end to the contact 56 and adapted to move the contact 56 into and out of engagement with the contact 55; and a support 59 having the other end of the bellows secured thereto and provided with a port 60 for supplying pressure to the interior of the bellows from a pressure supply pipe 61. The support 59, as illustrated herein, may be a bus bar 62 or the like which is secured to the machine frame, but insulated therefrom, and is electrically connected to the other pole of the secondary side of the transformer. The bus bar 62 may be electrically connected to the movable switch contacts 56 through the bellows in which case the bellows are constructed of a good conducting metal, but preferably each switch has a flexible jumper of low resistance electrically connecting the bus bar to the contact 56. The bellows normally hold the contacts out of engagement by their resilient tendency to collapse and engage the contacts by expansion due to fluid pressure therein.

Any suitable device may be utilized for opening and closing the switches to electrically connect and disconnect respectively the pairs of electrodes, and as illustrated herein, there may be provided an improved control device for regulating the pressure supplied to the bellows. The control device includes a distributor 17, comprising a cylindrical casing 65 provided with an inner longitudinally extending bore 66 which tapers downwardly and inwardly at its lower end 67, and a cap 68 closing the upper end of the bore which is provided with an aperture 69 connected to a fluid pressure supply pipe 70. The outer wall of the casing has a series of circumferentially spaced radially extending ducts or bores 71 each having one of the pipes 61 secured thereto and each duct has a pair of ports extending radially through the casing to the bore 66. As about to be described, one of the ports, for example, the upper port 74 may serve as a pressure supply port while the other or lower port 75 may serve as a pressure relief port. The casing further is provided with an exhaust port 76 connected by a pipe 77 to the return of the fluid pressure supply and extending radially through the casing to an annular recess 79 in the bore spaced longitudinally downwardly of the pairs of the ports 74 and 75.

Mounted in the lower end of the bore of the casing there is a conical rotor or valve plug 80 held downwardly by a spring 81 intermediate the upper end of the rotor and the underside of the cap 68. The rotor illustrated herein is adapted to successively connect each of the pressure ports 74 to the source of pressure while connecting the remaining relief ports to the exhaust port 76.

This may be accomplished by providing the rotor with a conduit 85 which is in communication with the upper or pressure supply end of the bore 66 and extends downwardly through the rotor and then radially outwardly so that it is adapted to be brought successively into registry with the pressure ports 74 of the casing. In order to relieve pressure in the switch bellows, the rotor is provided with a groove or passage 86 at the exterior and spaced downwardly from the pressure conduit which is adapted to connect the relief ports 75 to the exhaust port 76 of the casing. This groove is substantially annular but is interrupted below the outlet of the pressure conduit 85 so that all ports 75 are connected to the exhaust except the port paired with the port 74 receiving pressure.

In order to rotate the valve plug or rotor 80 the lower end 87 thereof extends through the bottom of the distributor casing 65 and mounted thereon is a gear 89 adapted to be driven by a drive gear 90 mounted on a shaft 91 which is rotated by a second gear 92 thereon meshing with a drive gear 94 on the armature shaft of a suitable motor 95.

Cooperating with the distributor there is provided a timing switch 96 which operates a timer 97 adapted to electrically connect the primary side of the transformer at desired intervals to a source of electrical energy. The timing switch is operated by a cam 99 on the shaft 91 and is so arranged that it is effective to close the electrical circuit every time after one of the switches 16 has been closed. The timer is further arranged to maintain the electrical circuit for a relatively short period, for example, a fraction of a second, and to break the circuit prior to separation of the contacts 55 and 56. By moving the contacts together and apart while the current is shut off, arcing between the contacts is eliminated.

While any suitable means may be provided for supplying fluid pressure, the means illustrated herein may comprise a supply tank 100, a motor 101, and a rotary compressor pump 102 driven by the motor. A pipe 104 is connected to the suction or intake side of the pump and this pipe extends into the tank below the liquid level thereof to supply fluid to the pump. At the pressure or exhaust side of the pump, there is a pressure supply main 105 to which the distributor pressure supply pipe 70 is connected. The supply main may be provided with a pressure regulator 106 adapted to maintain a uniform pressure and having a by pass pipe 107 connected to a return pipe 109 for returning excess fluid to the tank. The pressure main is adapted to supply pressure to the electrode operating cylinders through a three way valve 110. One outlet of the valve is connected to the main 105, another outlet is connected to a feeder pipe 111 having the electrode operating cylinder supply pipes 22 connected thereto in parallel, and the third outlet is connected to return pipe 109. The valve 110 has a slidable piston 112 which is so arranged that in one position pressure is supplied from the main 105 to the feeder pipe 111, and in another position, the feeder pipe 111 is connected to the return pipe 109 to relieve pressure in the electrode operating cylinders.

In operation of the machine the work W is placed between the pairs of upper and lower electrodes and is positioned so that the electrodes will contact it at points where welds are to be formed. The piston 112 of the valve 110 is then moved into a position permitting the flow of pressure from the pressure main 105 to the feeder pipe 111 whereby pressure is simultaneously admitted to the cylinders 20. The pistons 32 then move the piston rods or plungers 25 toward the work and cause the electrodes to simultaneously engage the work. While this occurs the springs 39 intermediate the pistons and plungers are further compressed, preferably to an extent where they are completely collapsed or fully compressed.

The distributor motor is then started and as the valve plug or rotor 80 revolves within the distributor casing, pressure is successively admitted to the switch bellows 57 preferably one at a time, through the rotor conduit 85, casing part 74, pipe 61 and part 60 in the bellows support. For example, as shown in Fig. 1, if bellows 57A is subjected to pressure, the contacts 55 and 56 of switch 16A are caused to engage to close the electrode circuit. Meanwhile, as will be observed, the bellows 57B, 57C, and 57D are not subjected to pressure and serve to hold apart the contacts of their respective switches 16B, 16C, and 16D.

Every time a switch has been closed by the distributor the timing switch electrically connects the primary side of the transformer which causes welding current to flow through a pair of welding electrodes for a welding period of a fraction of a second. As the weld is formed the work is fused at the point of weld and decreases slightly in thickness. As illustrated in Fig. 3, when this occurs, the fully compressed springs 39 in the cylinders cause the electrode operating plungers 25 to move quickly toward the work and force the electrodes against the work with suitable forging pressure. These springs exert a pressure as great as the pressure exerted upon the piston by the fluid. This is particularly desirable where a fluid pressure medium such as oil is utilized, because due to the sluggish characteristics and inelasticity of such fluids, the fluid cannot be depended upon to move the pistons 32 rapidly and cause the electrodes to follow-up the work and continue to apply sufficient pressure on the work at the required instant of fusion. Pre-compression of the springs, as utilized herein, together with additional compression during engagement of the work, loads the springs and provides the necessary forging pressure, independently of movement of the pistons 32. Such a spring may be of advantage even where the fluid pressure is compressed air, for it eliminates the inertia of the piston 32 in the follow-up movement, the movement being restricted to the piston rod and electrode above.

After current has passed through the electrodes, for example, electrodes 12B and 14B, the groove 86 connects the relief port 75 to the exhaust port 76 and the pressure in the bellows is relieved to cause the bellows to open the switch contacts 55B and 56B, prior to a succeeding operation of the timing switch. As the rotor continues to rotate, succeeding ports 74 admit pressure to their respective switch bellows and electric current is established by the timing switch at instances when the switches are closed. When all electrodes have formed a weld the rotor is stopped and the source of electric current for the transformer is disconnected. No arcing will result at the switch contacts 55 and 56, since setting the timer switch properly, the flow of welding current may be restricted from flowing except after the contacts 55 and 56 are closed, and the welding current cut off by the timer prior to the opening of the contacts. If desired the distributor valve 17 may be intermittently driven as by a Geneva movement as disclosed in my copending application Serial No. 143,600, filed May 19, 1937, now Patent No. 2,229,993, dated January 28, 1941, thereby speeding up the alignment of the valve ports. Should the timer fail to function in cutting off the flow of welding current, such arc as would ordinarily occur at the work by the separation of the electrodes will in the present system occur at the switch contacts 55 and 56, thus avoiding any possible spoiling of a work piece from this cause.

The precompressed spring 39 will be ordinarily under a compression nearly equal to the welding pressure desired, so that little work by the fluid pressure medium will be required in engaging the electrodes and placing the spring under further compression, thus cutting down the necessary flow of pressure medium.

After welding current has been applied to the respective pairs of electrodes, for example, to the electrodes 12B and 14B (Fig. 1) to form the weld, the electrode operating mechanism urges the electrodes against the work to apply dwelling pressure to the weld which continues during the formation of succeeding welds. After all welds have been formed, this dwelling pressure is maintained for a few seconds to finish the last weld. Thereafter the piston 112 of the pressure control valve 110 is moved into a position to connect the feeder pipe 111 to the return pipe 109, whereupon pressure exerted upon the electrode operating cylinder pistons 32 is relieved. The pistons 32 and the plungers 25 then move the electrodes away from the work to permit the work to be removed from the machine by gravity and spring 114.

It will thus appear that there is provided an apparatus capable of effecting a large number of welds in a period slightly in excess of that required to switch the current from one set of electrodes to the other in rapid succession. The usual delay necessitated in engaging and disengaging individual electrodes prior to engagement of succeeding electrodes is thus avoided, and the consequent time required greatly decreased.

As various changes may be made in the form, construction and arrangement of parts without departing from the spirit and scope of the invention and without sacrificing its advantages, it is to be understood that all matter herein is to be interpreted as illustrative and not in a limiting sense.

While the present application is outstandingly directed to the switching means for the welding current and to the arrangement of such means relatively to the electrodes and the source of current supply, applicant's copending application Serial No. 411,298, "Welding gun," filed September 18, 1941, which is a division of the present application, is directed to the particular means for moving the electrodes and for exerting pressure thereby.

What I claim is:

1. The combination with a pair of welding electrodes, of a fluid pressure device for moving at least one of said electrodes, a stationary support adjacent said electrodes, a pair of conductors insulated from each other and carried by said support, connections from each conductor to an electrode at least one connection being adapted for relative movement between the respective electrode and conductor, a movable contact for cooperation with one of said conductors to open and close the circuit through said electrodes, a Sylphon type fluid pressure device for actuating said movable contact, and a flexible connection bridging said Sylphon device.

2. The combination with a pair of welding electrodes of a fluid pressure device for moving at least one of said electrodes, a stationary support adjacent said electrodes, a pair of conductors insulated from each other and carried by said support, electrical connections from each conductor to an electrode, at least one connection being adapted for relative movement between the respective electrode and conductor, said one connection including a series switch having a fixed contact and a movable contact, and an expansible member adapted to force the movable contact into yieldable engagement with said fixed contact.

3. The combination with a pair of welding electrodes of a fluid pressure device for moving at least one of said electrodes, a stationary support adjacent said electrodes, a pair of conductors insulated from each other and carried by said support, electrical connections from each conductor to an electrode, at least one connection being adapted for relative movement between the respective electrode and conductor, said one connection including a series switch having a fixed contact and a movable contact, and an expansible member adapted to force the movable contact into yieldable engagement with said fixed contact, said fixed and movable contacts and said expansible member lying in a common axis between said conductors.

WILLIAM A. WEIGHTMAN.